United States Patent [19]

Alyfuku

[11] Patent Number: 4,636,055

[45] Date of Patent: Jan. 13, 1987

[54] CAMERA

[75] Inventor: Kiyoshi Alyfuku, Kanagawa, Japan

[73] Assignee: Canon Kabushiki Kaisha, Tokyo, Japan

[21] Appl. No.: 716,849

[22] Filed: Mar. 28, 1985

[30] Foreign Application Priority Data

Mar. 29, 1984 [JP] Japan .................... 59-59342
Dec. 28, 1984 [JP] Japan ................. 59-276965
Dec. 28, 1984 [JP] Japan ................. 59-276966

[51] Int. Cl.$^4$ ............................. G03B 17/18
[52] U.S. Cl. ................. 354/465; 354/127.12; 354/217
[58] Field of Search ............... 354/127.11, 127.12, 354/465, 468, 471, 474, 475, 217, 218, 215, 266, 267.1, 268, 289.1, 288

[56] References Cited

U.S. PATENT DOCUMENTS 4,240,735 12/1980 Maitani et al. ................. 354/288
4,483,601 11/1984 Sekida et al. ................. 354/288

Primary Examiner—Russell E. Adams
Attorney, Agent, or Firm—Toren, McGeady, Stanger, Goldberg & Kiel

[57] ABSTRACT

In the disclosed camera, the display indicating the camera's operating condition is visible from outside of the camera housing. When a lens cap, barrier, or other operating member makes it substantially impossible to expose the film in the camera, the information on the display is erased to warn the user that the camera is not ready for shooting film.

23 Claims, 8 Drawing Figures

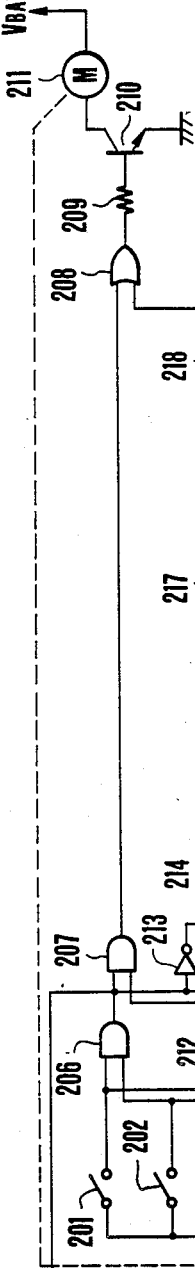
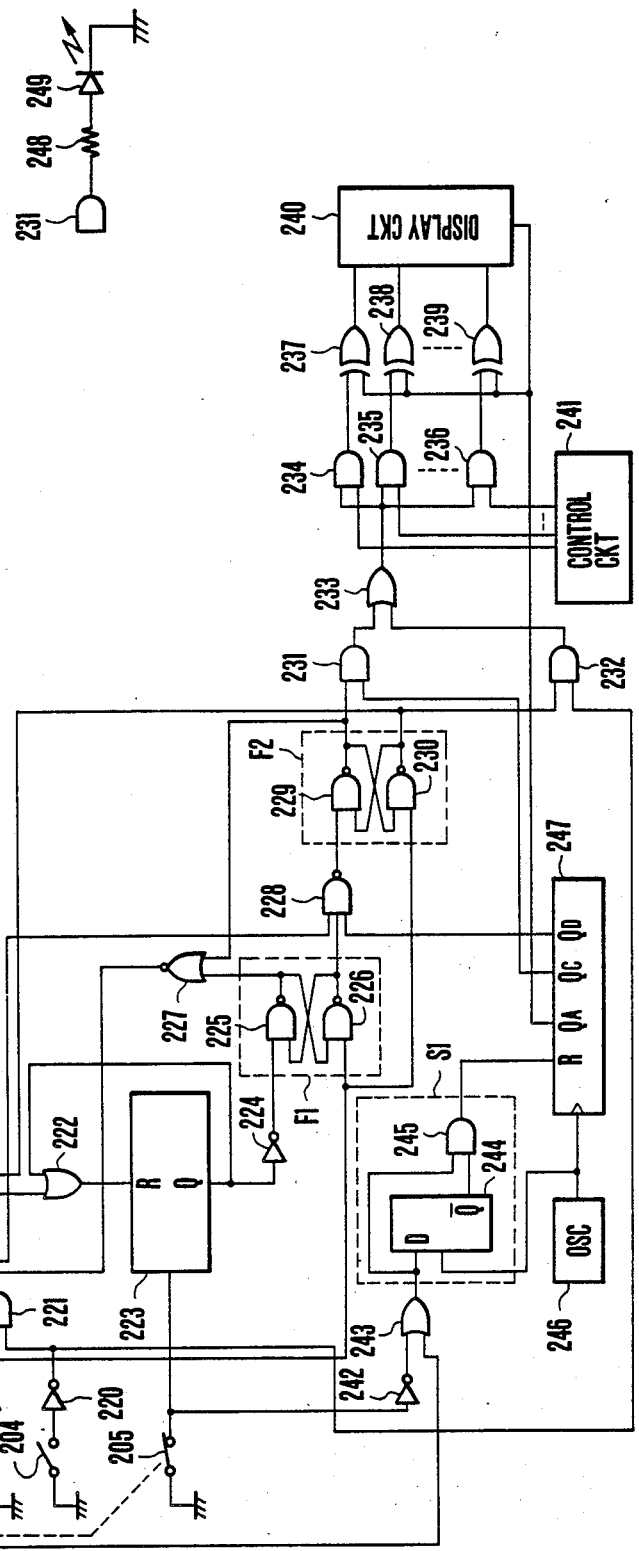
FIG.4
FIG.5

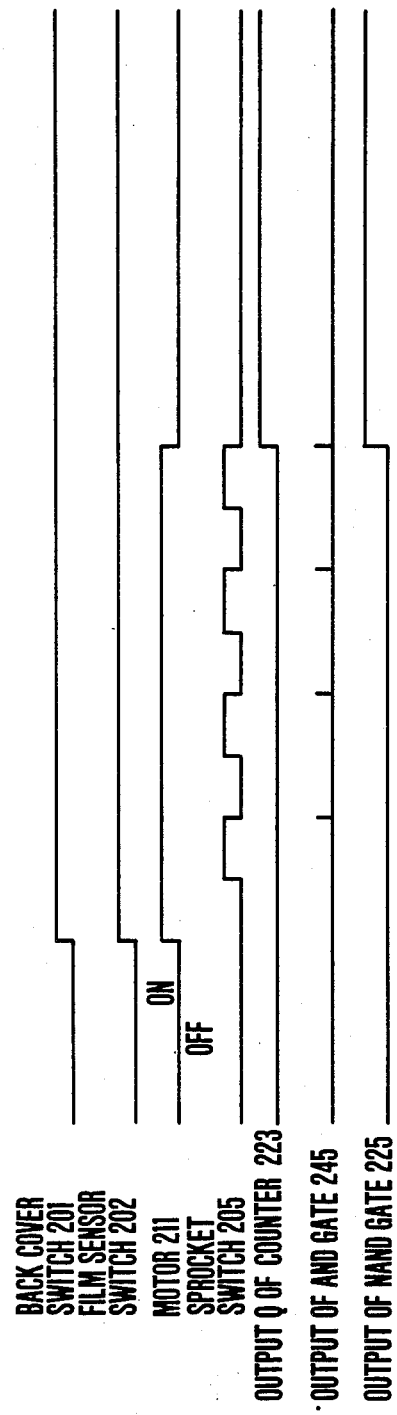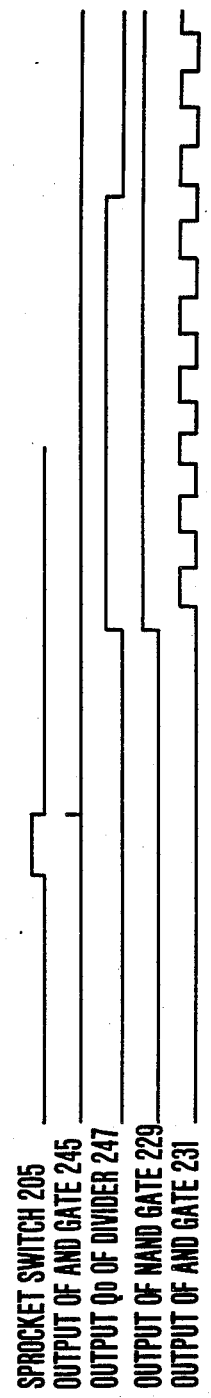

CAMERA

BACKGROUND OF THE INVENTION

This invention relates to cameras with which use of a member such as lens cap or barrier may make it substantially impossible to expose the photographic film.

DESCRIPTION OF THE PRIOR ART

Photographers generally place lens caps or barriers in front of the photographic lenses when carrying cameras about to protect the front surface of the lens from damage such as scratches. However, even with such lens caps covering the photographic lens, conventional camera shutters can be released. The problem is particularly significant with leaf shutter type cameras. Here, the finder image is often formed with light that does not pass through the photographic lens but through another optical system. Hence, shots have often been taken while the lens cap or the like attached on to the photographic lens.

To avoid this disadvantage, means have been provided for locking the release of the camera until the lens cap or the like was removed. However, the user still would not know whether or not the camera is ready for shooting by looking through the finder. This can be perceived only after the photographer actually touches the shutter button. Another camera is provided with a lens cap or barrier that covers not only the photographic lens but also the finder. In this case, the photographer could not become aware of the obstruction without looking through the finder. Moreover, severe limitations govern the construction and arrangement of a member for covering the photographic lens and the finder at the same time.

SUMMARY OF THE INVENTION

An object of the present invention is to eliminate the aforementioned drawbacks of a conventional camera. Another object is to provide a camera having a display of the number of exposed film frames, full charging of the strobe, the battery voltage, and the like arranged to be visible from outside of the camera housing, wherein when the lens cap, barrier, or other like manually movable member makes it substantially impossible for the camera to photograph by being left in the covering position, the aforementioned display data are erased to enable the photographer to readily know that actuation of shutter release does not lead to expose the film.

Yet another object of the invention is to provide a camera of the character described above in which even when the display warns the photographer that the camera is not ready the display information which is necessary despite the camera being substantially impossible of exposure, for example, the feeding of blank frames, the rewinding of the exposed film, and the full charging of the strobe are possible to display for convenience of the photographer.

Other objects of the invention will become apparent from the following description of embodiments thereof.

BRIEF DESCRIPTION OF THE DRAWINGS

FIG. 4 illustrates another practical example of the circuit for the camera of FIGS. 1 and 3.

FIG. 5 illustrates an example of variation of the circuit of the display of FIG. 4.

FIGS. 6(A) and 6(B) are timing charts of the circuit of FIG. 4 with FIG. 6(A) being a case of successful feeding of blank film frames, and FIG. 6(B) being a case of failure of feeding blank film frame.

DETAILED DESCRIPTION OF THE PREFERRED EMBODIMENTS

Figure 1:
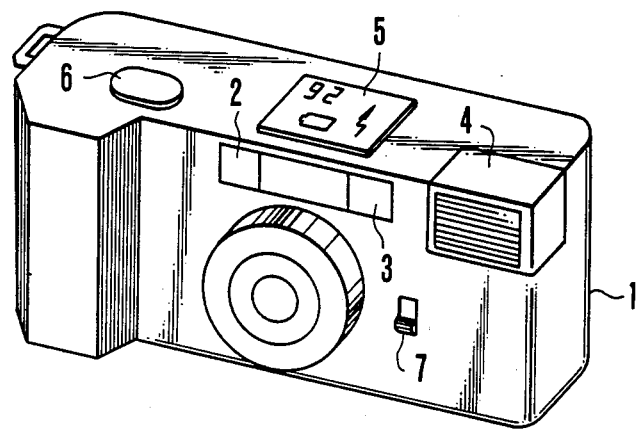
FIG. 1 is a perspective view illustrating the outer appearance of an embodiment of a camera according to the present invention.

In FIG. 1, which illustrates the outer appearance of a camera according to the invention, a camera housing 1 has windows 2 and 3 for an automatic focusing system, and a strobe lamp casing 4 in its front panel. On the top panel, an LCD display device displays the condition of feeding blank film frames, the number of exposed film frames, the full charge of the strobe, the battery voltage and other information. Member 6 is a release button. A barrier 8 (see FIG. 3) is opened and closed by a control knob 7. When the barrier 8 is opened as in FIG. 1, the LCD display device presents the display of the number of exposed film frames, a mark representing no battery loaded, and another mark representing that the strobe is fully charged.

Figure 2:
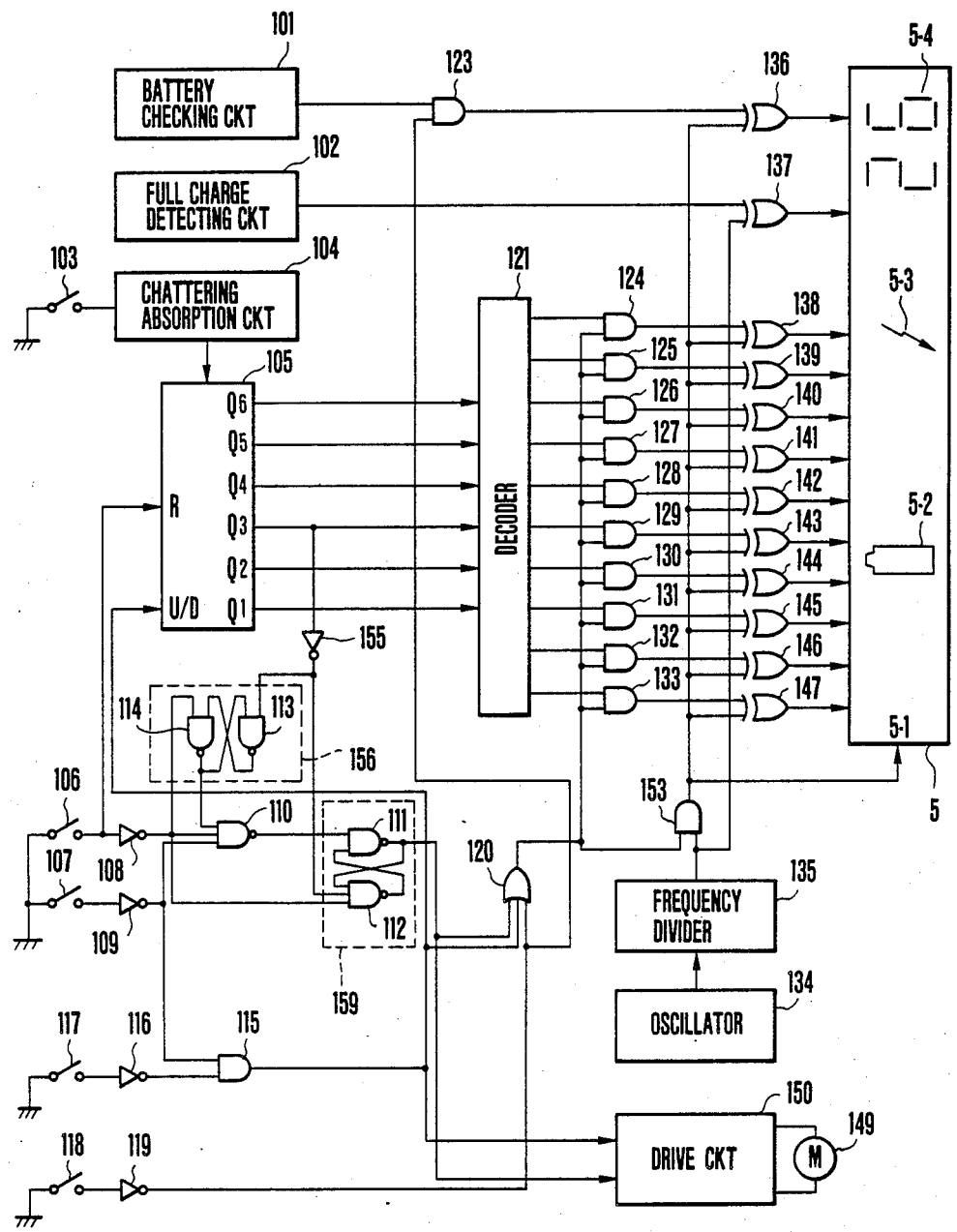
FIG. 2 is an electrical circuit diagram illustrating a practical example of the circuitry of the display device and other circuits associated therewith in the camera of FIG. 1.

FIG. 2 is a diagram of a display circuit and its associated circuits for the camera of FIG. 1. When the actual voltage of the battery falls below the satisfactory operating level, a checking circuit 101 produces an output of high level (hereinafter abbreviated as "H" level or "high"). When a main condenser or capacitor (not shown) in the strobe is fully charged, a detecting circut 102 produces a high output. Each time the film advances one frame, a sprocket switch 103 recycles one ON/OFF operation. Chattering of the sprocket switch 103 is absorbed by a circuit 104. An UP/DOWN binary counter 105 counts up or down the number of cycles of ON and OFF operation of the sprocket switch 103. When a back cover (not shown) is closed, a switch 106 is turned so the UP/DOWN counter 105 is released from the resetting state. When a film cartridge is loaded into the camera, a switch 107 is turned on. To rewind the film, the operator turns on a switch 117. When the barrier 8 is opened by the knob 7, a switch 118 is turned on. Responsive to closure of the switches 106 and 107, inverters 108 and 109 respectively change their output to high. As the film is initially wound four blank frames, and the content of the UP/DOWN counter 105 becomes "4", when its Q3 output changes to high, an inverter 155 produces an output of low level (hereinafter abbreviated as "L" level or "low"). NAND gates 113 and 114 constitute a latch circuit 156 responsive to change of the output of the inverter 108 to L level, that is, opening of the back cover, for poroducing an output of H level. After the back cover has been closed and the output of the inverter 108 has become high, when the output of the inverter 155 changes to low, that is, the feeding of the four blank frames is completed, the output of the latch circuit 156 goes low. With the back cover sensor switch 106 and the film cartridge sensor switch 107 though both being closed, when the Q3 output of the UP/DOWN counter 105 is "L", that is, only during the time when the film has been loaded, the back cover has been closed, and further the blank film feeding operation is not yet completed, the output of a NAND gate 110 is maintained at "L". NAND gates 111 and 112 constitute a latch circuit 159 responsive to change of the output of the inverter 108 to "L", that is, the opening of the back cover for producing an output of L level, and responsive to change of the output of the NAND gate 110 to "L" for changing its output to "H". That is, after the film has been loaded and the back cover has been closed, the output of the latch circuit 159 is maintained at "H" until the 4-blank frame feeding operation is completed. Inverters 116 and 119 produce high outputs when the rewind control switch 117 and the barrier sensor switch 118 turn on respectively. An AND gate 115 produces a high output only when both of the film cartridge sensor switch 107 and the rewind control switch 117 are ON, that is, when in the rewind mode with the film cartridge loaded. Responsive to this "H" signal at an U/D terminal of the counter 105 it starts to count in the DOWN mode. The winding and rewinding of the film is performed by an motor 149. A drive circuit 150 controls the operation of the motor 149 such that when the output of the latch circuit 159 is "H", that is, the first four film frames are continuously fed, the motor 149 rotates in a direction to wind up the film, and that when the output of the AND gates 115 is "H", that is, the rewind control switch 117 is ON with the film cartridge laded, the motor 149 rotates in the reverse direction to rewind the film. An OR gate 120 produces an output of "H", when at least one of the outputs of the latch circuit 159, AND gate 115 and inverter 119 is "H", that is, the blank feeding is in progress, or the rewinding of the film is in progress, or the barrier is open. A decoder 121 converts the combination of the outputs Q1 to Q6 of the UP/DOWN counter 105 to an appropriate form for 7-segment LCD elements of the aforesaid display device 5 so that the content of the UP/DOWN counter 105 can be displayed. An oscillator 134 produces a train of pulses which after having been treated by a frequency divider 135 drive the LCD display device 5. AND gates 124 and 133 are gated on when the output of the OR gate 120 is "H", that is, the blank feeding is in progress, or the rewinding of the film is in progress, or the barrier is open, so the output of the decoder 121 is passed therethrough. An AND gate 153 is gated on only when the output of the OR gate 120 is "H" so the drive pulses from the frequency divider 135 are passed therethrough. An AND gate 123 is gated on only when the barrier is opened to turn on the switch 118, so the signal from the battery checking circuit is passed therethrough. The outputs of the battery checking circuit 101, the stored charge detecting circuit 102 and the group of the AND gates 124 to 133 are connected to the display device 5 through respective exclusive OR gates 136, 137 and 138 to 147. Therefore, when the battery checking circuit 101 produces the output "H" representing the loss of the energy of the battery, when the detecting circuit 102 produces the output "H" representing that the strobe has been fully charged, or when the decoder 121 produces a combination of "H" outputs corresponding to the value counted by the UP-DOWN counter 105, the display of device 5 is given by the phases of these outputs different from that of the drive pulses applied from the frequency divider 135 to the common terminal 5-1 of the display device 5. That is, when the LCD display device 5 is given the signals of a phase different from that of the signal at the common terminal 5-1 it enters a display state so that the "battery loss" mark of a shape such as shown at 5-2 is displayed in response to the "H" output of the battery checking circuit 101, the "thunderbolt" mark for the full charge of the strobe is displayed in response to the "H" output of the detecting circuit 102, and a numeral character or characters for the number of exposed frames is or are displayed depending upon the combination of outputs of "H" from the decoder 121. And, the display of this information can be viewed on the top panel of the camera housing as shown in FIG. 1.

In operation, when the barrier 8 is opened as shown in FIG. 1 to make the camera ready for shooting, the switch 118 of FIG. 2 is turned on, and the output of the inverter 119 is changed to "H". Therefore, the AND gate 123 can pass the signal from the battery checking circuit 101 therethrough. Such change of the output of the inverter 119 to "H" also causes the OR gate 120 to change its output to "H". Therefore, the AND gate 153 is gated on to pass the drive pulses from the frequency divider 135 to the exclusive OR gate 136. Now if the battery checking circuit 101 produces the warning signal "H" for "battery loss", the display device 5 presents the "battery loss" mark at 5-2. The change of the output of the OR gate 120 to "H" also causes the AND gates 124–133 to be able to pass the signal for "the number of film frames" form the decoder 121. At the same time, the drive pulses from the frequency divider 135 are allowed to pass through the AND gate 153 to the exclusive OR gates 138 to 147, so the number of film frames is displayed at 5-4. Also when the detecting circuit 102 produces the output "H" representing that the strobe has fully been charged and applies it directly to the exclusive OR gate 137, the mark for the full charging of the strobe is displayed at 5-3 by the drive pulse directly supplied from the frequency divider 135.

Figure 3:
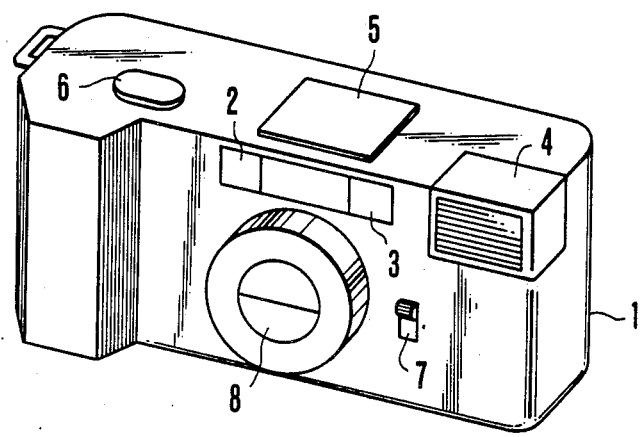
FIG. 3 is similar to FIG. 1 except that the barrier is closed and no display is presented.

Conversely when the barrier 8 is closed as shown in FIG. 3, or the camera can no longer make an exposure, the switch 118 is opened and the output of the inverter 119 is changed to "L". Therefore, the AND gate 123 is gated off to block the signal from the battery checking circuit 101. Thus, the closure of the barrier 8 results is no presentation of the "battery loss" mark 5-2 by the display device 5. Also with the barrier 8 closed, when the outputs of the latch circuit 159 and AND gate 115 are "L", that is, neither a blank frame feeding operation, nor a film rewinding operation is initiated, the output of the OR gate 120 is "L", rendering the AND gates 124 to 133 to block the signal from the decoder 121. Thus, the closure of the barrier 8 also results in no presentation of the of "the number of fed film frames" 5-4 by the display device 5 provided that neither the blank feeding mode nor the rewinding mode is in operation. Even under this condition, when the strobe is fully charged, however, the display of the "strobe ready" mark 5-3 is presented by the display device 5.

In short, so long as the barrier 8 is closed, it is usual that nothing is displayed on the display device 5 as shown in FIG. 3. However, when the strobe is fully charged, the "strobe ready to fire" mark 5-3 starts to appear on the display device 5. Also, when the camera is switched to the blank feeding mode or the film rewind mode, the numerals "number of fed film frames" 5-4 are also displayed. Therefore, despite the closing of the barrier 8 being overlooked, the use, seeing that the display device does not display the usually available numerals for the number of exposed film frames, can readily recognize that the camera is hindered from making any exposure. Even with the barrier closed, the user can feed blank frames or rewind the film with the help of the display of the number of blank frames fed, or the ever-decreasing numbers of exposed frames on the display device 5. Further when the charging of the strobe is completed, this fact is indicated by the display device 5 regardless of whether or not the barrier is closed, provided that the camera has been switched to the flash exposure mode. Therefore, the user can see which mode, daylight or flash, is in effect. The use of such a display control circuit offers the additional advantage that the display 5 is driven only for the necessary so wasteful consumption of energy can be minimized as far as possible. The display device 5 may be otherwise positioned on the back panel of the camera housing in the neighbourhood of the finder window, for the user to be more readily aware of the camera not being ready for shooting film.

FIG. 4 illustrates another embodiment of the display control circuit according to the present invention. In this embodiment, when the barrier 8 is closed and the blank feeding operation has failed to perform its function, the display device 5 presents a warning indicating the faulty feed of blank film frames. This occurs even if the display device is in the erasing condition. In FIG. 4, a switch 201 turns off when the back cover is closed. A switch 202 turns off when a film cartridge is inserted into and seated in its chamber. A release switch 203 when closed initiates a sequence of camera operations. A switch 204 turns on when the barrier is opened to ready the camera for shooting. A switch 205 acts as a detector of the one-frame advance of the film. It performs for example, one cycle of an ON-to-OFF operation for every one frame the film advanced by a sprocket (not shown). The figure includes AND gates 206 and 207; an OR gate 208; a resistor 209; a switching transistor 210; a film winding motor 211; inverters 212 and 213; AND gates 214 and 215; an OR gate 216; an exposure control circuit 217 for controlling exposure in accordance with object brightness; a motor control circuit 218 responsive to termination of the exposure for energizing the motor 211 to automatically advance the exposed film through the length of one frame; inverters 129 and 220; an AND gate 221; an OR gate 222; counter 223 for counting the number of cycles of ON-to-OFF operation of the sprocket switch 205 and, upon detection of attainment of the number to four, producing a high signal at its output Q; an inverter 224; NAND gates 225 and 226 constituting a latch circuit F1; a NOR gate 227; a NAND gate 228; NAND gates 229 and 230 constituting a latch circuit F2; AND gates 231 and 232; an OR gate 233; AND gates 234 to 236; exclusive OR gates 237 to 239; a display device 240 in the form of a liquid crystal panel or the like; a control circuit 241 for producing outputs which are displayed by the display device 240; an inverter 242; an OR gate 243; a D type flip-flop 244; an AND gate 245; the D type flip-flop 244 and the AND gate 245 constitute a one-shot circuit S1; an oscillator 246; a frequency divider 247 receptive of the output of the oscillator 246 for producing outputs $Q_H$, $Q_B$ and $Q_C$ of different frequency.

The operation of the circuit of FIG. 4 is as follows:

(1) When the camera is not loaded with film, the film cartridge sensor switch 202 remains ON, and the inverter 212 produces a high output which is applied to the AND gate 214. When the barrier 8 is opened, the switch 204 turns on, and the inverter 220 applies an "H" signal to the AND gate 221. The, when the release switch 203 is turned on, the output of the AND gate 221 changes to "H", the output of the AND gate 214 to "H" and the output of the OR gate 216 to "H". Therefore, the exposure control circuit 217 starts to operate. When the exposure operation is terminated, the exposure control circuit 217 excites the motor control circuit 218. The output "H" from the circuit 218 is applied through the OR gate 208 and the resistor 209 to turn on the transistor 210 thereby energizing the motor 211 and causing it to rotate. In a time determined by a timer (not shown) provided in the motor control circuit 218, the transistor 210 is turned off to stop rotation of the motor 211.

Meanwhile, because the film cartridge sensor switch 202 is ON, the output of the AND gate 206 is "L". Therefore the NAND gate 228 produces an output "H" which is applied to the NAND gate 229 of the latch circuit F2. Because, at the time of opening of the back cover, the switch 201 is in ON state, "L" is applied to the NAND gate 230, hence the latch circuit F2 is latched so that the output of the NAND gate 229 exhibits "L" and the output of the NAND gate 230 "H". This condition is retained even after the back cover is closed. Therefore, the output of the AND gate 231 is "L", and the output of the AND gate 232 becomes "H" when the barrier 8 is opened to turn on the switch 204. The latter output is applied through the OR gate 233 to the AND gates 234 to 236 at one input thereof. Therefore, the signal from the control circuit 241 is allowed to pass through the AND gates 234 to 236 to the exclusive OR gates 237 to 239 where this signal is changed in phase as different from the drive pulse from the output $Q_A$ of the frequency divider 237. Hence, the combinations of the outputs of the control circuit 241 are selectively displayed by the display device 240.

On the other hand, if the barrier is closed, the opening of the switch 204 causes the output of the AND gate 232 to become "L". Since the output of the AND gate 231 is also "L" as has been mentioned above, the output of the OR gate 233 becomes "L". Thus, nothing is displayed on the display device 240.

In short, the barrier 8 is opened and the camera is ready for shooting. Then, the display device 240 is rendered operative. But when the barrier 8 is closed, as the camera is no longer able to make an exposure, the informations on the display 240 are erased.

(2) When the camera is loaded with film, the film cartridge is loaded and the back cover is closed. The back cover sensor switch 210 and the film cartridge sensor switch 202 are then both turned off. Therefore, the output of the AND gate 206 becomes "H", the output of the inverter 213 becomes "L", and the output of the OR gate 222 becomes "L", so the counter 223 is released from the reset. Therefore, the counter 223 becomes able to count the number of cycles of ON/OFF operation of the sprocket switch 205. In the meanwhile, before the film cartridge is loaded and the back cover is closed, the output of the AND gate 206 was "L", and the output of the inverter 213 was "H". Therefore, the output of the OR gate 222 was "H". In the reset state of the counter 223, therefore, its output Q is "L". Therefore, the NAND gate 225 of the latch circuit F1 receives the output "H" from the inverter 224. Because, at the time of opening of the back cover, the switch 201 is ON, "L" is applied to the NAND gate 226, thereby the latch circuit F1 is latched with the output of the NAND gate 225 to "L", and the output of the NAND gate 226 to "H". And, this condition is retained even after the back cover is closed. Also as for the second latch circuit F2 too, because, at the time of opening of the back cover, the back cover sensor switch 201 is ON, the input of the NAND gate 230 is "L". Meanwhile, the input of the NAND gate 229 is "H" because, at the time of opening of the back cover, the output of the AND gate 206 is "L", and the output of the NAND gate 228 is "H". Thus, the output of the NAND gate 229 is latched to "L", and the output of the NAND gate 230 is latched to "H". Therefore, the output of "H" from the NOR gate 227 is applied to the AND gate 207 at one input thereof. For this reason, with the camera loaded with film, when the back cover is closed, the backcover sensor switch 201 and the film cartridge sensor switch 202 are both opened, so the output of the AND gate 207 is changed to "H". This output is applied through the resistor 209 to turn on the transistor 210. Therefore, the motor 211 starts to rotate, initiating a blank film frame feeding operation. As teh film moves, the sprocket switch 205 turns on and off repeatedly. The counter 223 counts the number of cycles of ON/OFF operation of the sprocket switch 205. When that number reaches a value equivalent to four frames of film, the output Q changes from "L" to "H". This manner is shown in the timing chart of FIG. 6(A). When the Q output of the counter 213 changes from "L" to "H", the output of the inverter 224 becomes "L", so that the output of the NAND gate 225 is latched to "H". Therefore, the output of the NOR gate 227 becomes "L", and the output of the AND gate 207 becomes "L", so the transistor 210 is turned off to stop rotation of the motor 209, thus terminating the blank feeding operation.

Loading of the film followed by the closure of the back cover turns on both of the switches 201 and 202 and the AND gate 206 produces an output "H". Then, because the output of the NAND gate 226 is latched to "H", when the output $Q_D$ of the frequency divider 247 becomes "H", the output of the NAND gate 228 is changed from "H" to "L". However, as the output of the AND gate 206 becomes "H", when the blank feeding operation is initiated, the change of the output of the AND gate 206 to "H" causes the one-shot circuit S1 to reset the frequency divider 247. After that, if the blank feeding operation goes normally, the one-shot circuit S1 resets the frequency divider 247 in response to ON/OFF switching of the sprocket switch 205, and, therefore, to change of the outputs of the inverter 242 and OR gate 232. This reset of divider 247 occurs before the output $Q_D$ of the frequency divider becomes "H". Therefore, there is no possibility of occurrence of the change of the output of the NAND gate 228 from "H" to "L". Hence, the latch circuit F2 is held in the state which was set when the back cover is open, that is, in the state where the output of the NAND gate 229 is "L" and the output of the NAND gate 230 is "H". Similarly to the first case when the camera is not loaded with film, it is only when the barrier 8 is opened to make the camera ready for shooting that the display device 240 assumes the display state.

On the other hand, if the blank feeding operation fails, when the film is not fed, the sprocket switch 205 is left so as to turn on and off. For example, as shown in FIG. 6(B), the sprocket switch 205 is assumed to have only once turned on and off. Thereby, the one-shot circuit S1 can no longer reset the frequency divider 247. After the lapse of a longer time than the time it takes the sprocket switch 205 to perform the first cycle of ON/OFF operation, the output $Q_D$ of the frequency divider 247 changes from "L" to "H". At this time, as a matter of course, the counter 223 has not yet counted the prescribed number of cycles of ON/OFF operation yet. Hence, output Q remains "L", and the output of the NAND gate 226 is left unchanged from "H". Therefore, all the inputs of the NAND gate 228 become "H", and its output changes from "H" to "L", causing the output of the NAND gate 229 to be latched to "H", and the output of the NAND gate 230 to be latched to "L". The AND gate 232 is now gated off.

Meanwhile, the AND gate 231 is gated on to pass the output $Q_G$ of the frequency divider 247 therethrough. Therefore, the display device 240 displays the signal from the control circuit 241 intermittently in synchronism with the output $Q_C$ of the frequency divider 247. That is, when the blank feeding operation has failed, regardless of whether or not the barrier 8 is open, in other words, even if the barrier 8 is closed, despite the informations on the display device 240 are erased to warm that the camera is not able to make any exposure, the display device 240 is exclusively rendered operative and, moreover, this display is presented in the blinking form, warning the user that faulty blank feeding operation has occurred.

At the same time, the output of the NAND gate 229 changes to "H", causing the output of the NOR gate 227 to become "L", and the output of the AND gate 207 to become "L", which in turn causes the transistor 210 to turn off. Thus, rotation of the motor 211 is stopped. Also the change of the output of the NAND gate 230 to "L", gates the AND gate 215 off so that even when the release switch 203 is turned on, the output of the AND gate 215 does not become "H". Thus, actuation of a camera release is also prohibited.

FIG. 5 illustrates an example of modification of the display device of FIG. 4. The output of the AND gate 231 of FIG. 4 is applied through a resistor 248 to an LED 249 so that when feeding of blank frames has failed, the LED 249 is intermittently energized, warning the user that the blank feeding operation has failed. In this case also, regardless of whether the barrier 8 is open or closed, the LED 249 blinks, warning of the failure of blank feeding.

Figure 7:
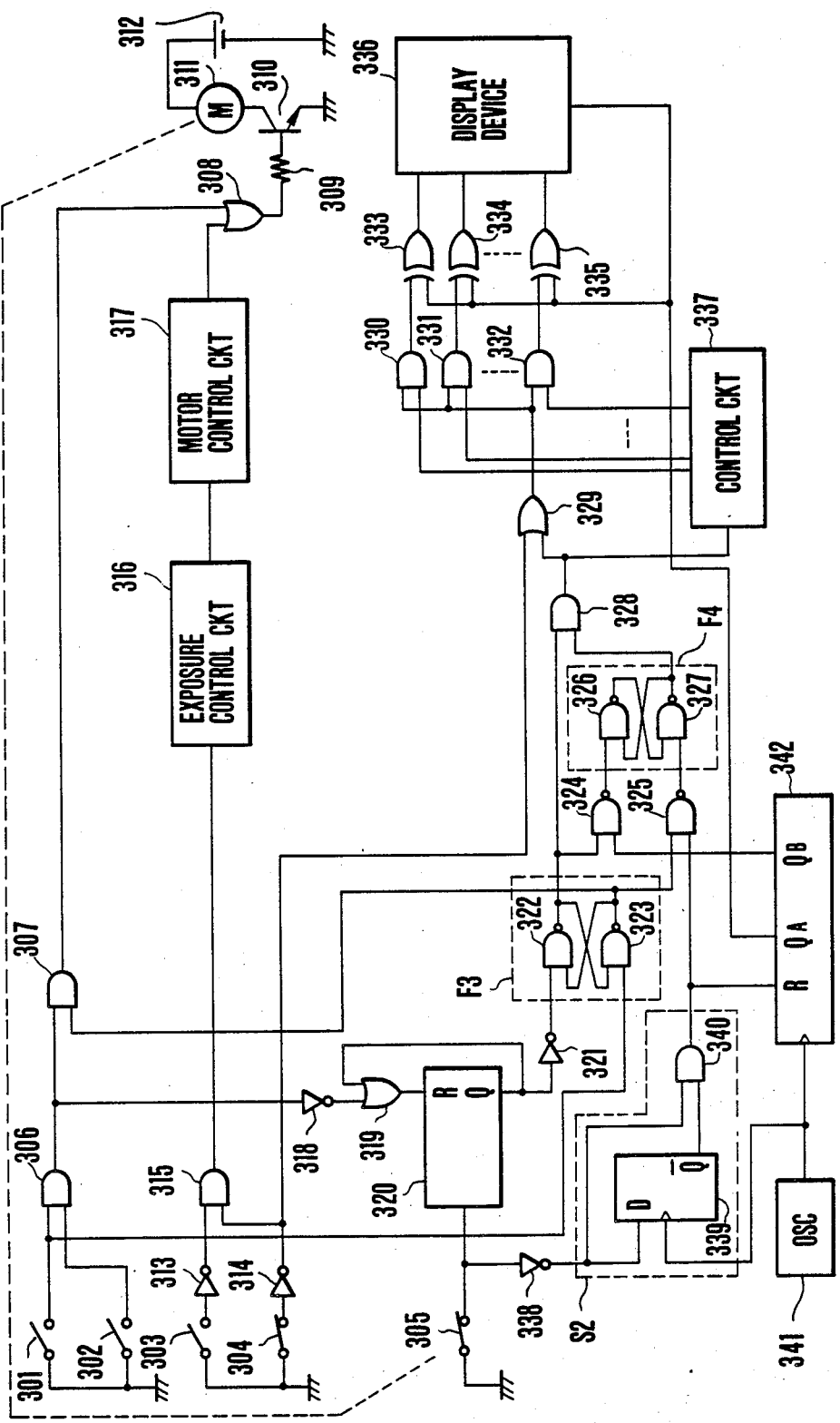
FIG. 7 is an electrical circuit diagram illustrating still another example of the circuit of FIG. 2.

FIG. 7 illustrates still another embodiment of the display control circuit according to the invention. In this embodiment, because the barrier is closed, and the display device operates in the erasing mode, when the blank feeding operation has been successively performed, the display device presents a display that the camera is ready for making exposures. In FIG. 7, when the back cover is closed, a switch 301 turns off. When a film cartridge is inserted into and seated in a chamber therefor, a switch 302 turns off. When a release switch 303 is turned on, an exposure operation is initiated. When the barrier is opened to ready the camera for shooting, a switch 304 turns on. As the film moves, for example, each time the film is advanced one frame, a switch 305 once turns on and off by which one-frame advancement of the film is detected. The circuit further includes AND gates 306 and 307, an OR gates 308, a resistor 309, a switching transistor 310, an electric motor 311 for winding up the film, a battery 312 as an electrical power source for the motor 311, inverters 313 and 314, an AND gate 315, an exposure control circuit 316 for automatically controlling the exposure in accordance with the object brightness, a motor control circuit 317 responsive to termination of the exposure operation by the exposure control circuit 316 for energizing the motor 311 until the exposed film is advanced by one frame; an inverter 318, an OR gate 319, a counter 320 for counting the number of cycles of ON/OFF operation of the sprocket switch 305 upon detection of the fact that the film has been wound up by four blank frames to produce a signal of "H" at the output Q thereof, an inverter 321, NAND gates 322 and 323 constituting a latch circuit F3, NAND gates 324 and 325, a latch circuit F4 comprised of NAND gates 326 and 327, an AND gate 328, an OR gate 329, AND gates 330 to 332, exclusive OR gates 333 to 335, a display device 336 in the form of a liquid crystal panel positioned on the camera housing; a control circuit 337 for producing outputs which have to be displayed by the display device 336, an inverter 338, a D type flip-flop 339, an AND gate 340, the D type flip-flop 339 and the AND gate 340 constituting a one-shot circuit S2, an oscillator 341, and a frequency divider 342 receptive of the output of the oscillator 341 for producing outputs $Q_A$ and $Q_B$.

The operation of the circiut of FIG. 7 is as follows: When the film cartridge is inserted into the cartridge chamber, and the back cover is closed, the back cover sensor switch 310 and the film cartridge sensor switch 302 are both turned off. Therefore the AND gate 306 produces an output of "H", and the inverter 318 and the OR gate 319 produce outputs of "L", to release the counter 320 from the reset state. The counter 320 is now rendered ready to count the number of cycles of ON/OFF operation of the sprocket switch 305. In the meanwhile, before the film cartridge is inserted and the back cover is closed, the output of the AND gate 306 was "L", and the output of the inverter 318 was "H". Therefore, the output of the OR gate 319 was "H", the counter 320 was being reset so that its output Q was "L". Therefore, the NAND gate 322 of the latch circuit F3 is supplied with "H" from the inverter 321. Because, at the time of opening of the back cover, the switch 301 is ON, the NAND gate 323 is supplied with "L". In the latch circuit F3, therefore, the output of the NAND gate 322 is latched to "L", and the output of the NAND gate 323 to "H". This condition is sustained even after the back cover is closed. Therefore, because the output of "H" of the NAND gate 323 is applied to the AND gate 307 at one of its inputs, when the film cartridge is inserted and the back cover is closed to turn off both of the switches 301 and 302, the output of the AND gate 307 changes to "H" which is applied through the resistor 309 to turn on the transistor 310. Then, the motor 311 rotates, initiating an operation of feeding blank frames of film. As the film moves, the ON/OFF operation of the sprocket switch 305 is recycled. As the counter 320 counts the number of cycles of ON/OFF operation of the sprocket switch 305, when that number reaches a value equivalent to four frames of film, the output Q changes from "L" to "H". Such change of the output Q of the counter 320 causes change of the output of the inverter 321 to "L". Therefore, the AND gate 323 is latched to "L", changing the output of the AND gate 307 to "L". Therefore, the transistor 310 is turned off and the rotation of the motor 309 stops, terminating the blank feeding operation.

In the meanwhile, as to the display device 336, when the OR gate 329 produces an output of "H", the AND gates 330 to 332 becomes able to pass signals from the control circuit 337 therethrough. The signals from the control circuit 337 after having passed through the AND gates 330 to 332 go through the exclusive OR gates 333 to 335 and are displayed by the display device 336. Because the output of the NAND gate 322 is latched in "L" until the blank feeding operation terminates, the output of the AND gate 328 is "L". Only when the barrier 8 is open, or the barrier switch 304 is ON, the inverter 314 produces an output of "H", thereby the display device 336 is rendered operative in the displaying mode. In other words, before the termination of the blank feeding operation, upon closing the barrier 8, the display of the display device 336 is erased, thereby informing the user that the camera is not able to make exposures.

During the blank feeding operation, the signal from the sprocket switch 305 is applied through the inverter 338 to the one-shot circuit S2. Responsive to ON/OFF of the sprocket switch 305, therefore, the one-shot circuit S2 produces a pulse of short duration. Because, during the blank feeding operation, the output of the NAND gate 322 is "L", the NAND gate 324 has the output of "H", and the NAND gate 323 has the output of "H". Each time the one-shot circuit 305 produces one pulse, the output of the NAND gate 325 becomes "L". Therefore, the output of the latch circuit F4 is set to "H". When the blank feeding operation is terminated, the output Q of the ocunter 320 becomes "H", and the NAND gate 322 produces an output of "L". Responsive to this, the AND gate 328 produces an output "H", causing the control circuit 337 producing an outpot representing the fact that the blank feeding operation has terminated. At the same time, regardless of whether the barrier is open or closed, the output of the OR gate 329 is changed to "H". As a result, if the blank feeding operation has successfully been perfomed, despite the barrier being closed, that is, display device 336 is operating in the erasing mode, to inform one that exposures are impossible to make, a numeral "1" in the number of film frame is exceptionally displayed, informing the user that the blank feeding operation has been successful. The frequency divider 342 is reset by the pulse of the one-shot circuit S2 during the blank feeding operation. However, after the termination of the blank feeding operation, the one-shot circuit S2 produces no more pulse. Thus, only after a prescribed time from the termination of the blank feeding operation does the output $Q_B$ of the frequency divider 342 change from "L" to "H". Since the output of the NAND gate 322 has become "H" in response to the termination of the blank feeding operaion, such change of the output $Q_B$ the frequency divider 342 causes change of the output of the NAND gate 324 to "L". Therefore, the output of the latch circuit F4 becomes "L", and the AND gate 328 produces an output of "L". With the barrier 8 closed, therefore, after the elapse of the prescribed time from the termination of the blank feeding operation, that information on the display device 336 is erased, and the display device 336 is made to display the information again only when the barrier 8 will be opened.

After the success of the blank feeding operation has been recognized, the information on the display device 336 is automatically erased. This to a very advantageous electrical power saving counter-measure for the camera which cannot accommodate but a battery of small capacity. Another advantage is that when the automating erasing has occurred, the user is warned again about whether the barrier 8 is open or closed. For note, so long as the barrier 8 is open, the displaying stage of the display device 336 is sustained as it stands.

After that, the user will open the barrier 8, and as the barrier switch 304 remains ON, then turns on the release switch 303, so the outputs of the inverters 313 and 314 are both cahnged to "H", when the output of the AND gate 315 is then changed to "H", the exposure control circuit 316 is excited, initiating an exposure operation. When the exposure operation is terminated, the motor control circuit 317 turns on the transistor 310. Then, the motor 311 is energized to rotate until the film is advanced one frame.

It should be pointed out that in any of the above-described embodiments, the barrier switch may be actuated by using a member other than the barrier, for example, a lens cap, or a shutter release safety cover, provided that member when in use renders the camera substantially impossible to make exposures, when the invention is achieved.

As has been described above, according to the present invention, when the lens cap, barrier, shutter release safety cover, or other operating member which when in use renders the camera substantially impossible to make exposures lies in the active position, the information representing the conditions of the various parts of the camera are made to be erased from the display device positioned to be visible from the outside of the camera housing, warning the user that the camera is not yet ready for shootings. Therefore, the user can set the camera in making exopsures without failure. Moreover, when the camera is not in use, because the display of the informations is unnecessary to present, as the barrier is closed, the display is erased, thereby giving an additional great advantage that a large amount of electrical energy can be saved, if the battery in the camera is of small capacitance.

Another feature of the invention is that the information which must necessarily displayed when the camera is being prepared to shoot, for example, whether or not the blank feeding operation goes well, when a faulty operation occurs in feeding blank frames of film, when the film is loaded perfectly, when the film is being rewound, and whether or not the strobe is fully charged, are display to assist the user in setting the various functions of the camera, even when the camera lens protection member covers the lens.

What is claimed is:

1. A camera comprising,
   (A) A display circuit for displaying information necessary for exposing film;
   (B) exposure interrupting means for making it substantially impossible for said camera to expose film;
   (C) switching means for erasing display of said display circuit in response to the exposure interrupting means becoming operative, and for causing said display circuit to display in response to the operative state of the exposure interrupting means being released; and
   (D) intrusion means for causing said display circuit to display necessary information even when said exposure interrupting means has made it substantially impossible for said camera to expose film.

2. A camera according to claim 1, wherein said intrusion means includes charging state detecting means for causing said display circuit to display a charging state of a flash device.

3. A camera according to claim 1, wherein said intrusion means includes blank feeding state detecting means for causing said display circuit to display a blank feeding state of film.

4. A camera according to claim 3, wherein said blank feeding state detecting means includes timer means for operating said blank feeding state detecting means only for a predetermined time.

5. A camera according to claim 3, wherein said camera includes a shutter and said blank feeding state detecting means includes inhibition means for inhibiting release of the shutter when detecting a failure of blank feeding.

6. A camera according to claim 1, wherein said intrusion means includes feeding state detecting means for causing said display circuit to display a feeding state of film.

7. A camera according to claim 6, wherein said feeding state detecting means includes feeding response means for causing said display circuit to display only during the feeding of film.

8. A camera according to claim 7, wherein said feeding state includes a blank feeding state.

9. A camera according to claim 7, wherein said feeding state includes a rewinding state.

10. A camera comprising:
    (A) a display circuit for displaying information;
    (B) exposure interrrupting means for making it substantially impossible for said camera to perform photography;
    (C) switching means for erasing display of said display circuit in response to the exposure interrupting means becoming operative, and for causing said display circuit to display in response to the operative state of the exposure interrupting means being released; and
    (D) intrusion means for causing said display circuit to display necessary information even when said exposure interrupting means makes it substantially impossible for said camera to perform photography.

11. A camera according to claim 10, wherein light sensitive means are exposed in the camera and said intrusion means includes feed state indicating means for causing said display circuit to display a feed state of light sensitive means.

12. A camera according to claim 11, wherein said feeding state indicating means includes feed response means for causing said display circuit to display during the feeding operating.

13. A camera according to claim 12, wherein said feed response means includes latch means for maintaining the displaying state.

14. A camera according to claim 13, wherein said latch means includes a flip-flop circuit.

15. A camera according to claim 11, wherein said feed state indicating means includes blank feeding state indicator means for causing said display circuit to display a blank feeding state of light sensitive means.

16. A camera according to claim 15, wherein said blank feeding state indicator means includes timer means for causing said display circuit to display a blank feeding state of light sensitive means for a predetermined time.

17. A camera according to claim 15, wherein said blank feed state indicator means includes evidencing means for evidencing failure of the blank feeding in said display circuit if the blank feeding fails.

18. A camera according to claim 17, wherein said blank feeding failure evidencing means includes flicker indication control means for effecting a flicker indication in said display circuit.

19. A camera according to claim 15, wherein said blank feeding state indicator means includes blank feeding success indicating means for indicating success of the blank feeding in said display circuit if the blank feeding is successful.

20. A camera according to claim 19, wherein said blank feeding success indicating means includes timer means for evidencing for a predetermined time in said display circuit that the blank feeding is successful.

21. A camera according to claim 11, wherein said feed state indicating means includes rewinding state indicating means for causing said display circuit to display a rewinding state of light sensitive means.

22. A camera according to claim 17, wherein said blank feeding failure indicator means includes an inhibition means for inhibiting an exposure operation when the blank feeding fails.

23. A camera according to claim 10, wherein said intrusion means includes charging state indicating means for causing said display circuit to display a charging state of a flash device.

* * * * *